US005905445A

United States Patent [19]

[11] Patent Number: 5,905,445

[45] Date of Patent: May 18, 1999

Gurney et al.

[54] KEYLESS ENTRY SYSTEM WITH FAST PROGRAM MODE

[75] Inventors: Quentin Earl Langton Gurney, Kokomo; James Frank Patterson, Greentown, both of Ind.

[73] Assignee: Delco Electronics Corp., Kokomo, Ind.

[21] Appl. No.: 08/851,295

[22] Filed: May 5, 1997

[51] Int. Cl.[6] .................................. G06F 7/04; G07D 7/00

[52] U.S. Cl. .................................. 340/825.31; 340/825.34

[58] Field of Search .................................. 380/23, 24, 25, 380/49, 50; 340/825.31, 825.34, 825.69, 825.72

[56] References Cited

U.S. PATENT DOCUMENTS 5,506,905 4/1996 Markowski et al. ...................... 380/25

*Primary Examiner*—Michael Horabik
*Assistant Examiner*—Jean B. Jeanglaude
*Attorney, Agent, or Firm*—Jimmy L. Funke

[57] ABSTRACT

A system for remotely controlling a desired door locking or other function in a vehicle or other protected environment has a transmitter and receiver for communicating a message including a sequence number, the code of a selected function to be performed and an authenticator. An algorithm in the transmitter and in the receiver has a cryptographic key and a seed code. Each algorithm generates the authenticator as a function of both the seed code and the function code; if the authenticators are equal, the message is valid. Upon each transmission the seed code is updated and the sequence number is incremented. The receiver updates its seed code according to the transmitted sequence number to keep the algorithm in synchronism. Upon manufacture the transmitter sends the initial seed code and key to the receiver to program the receiver. This data is sent without delay when the battery is first installed but later a time delay is imposed to prevent sending inadvertent program messages. Resynch messages are also sent after a delay.

10 Claims, 2 Drawing Sheets

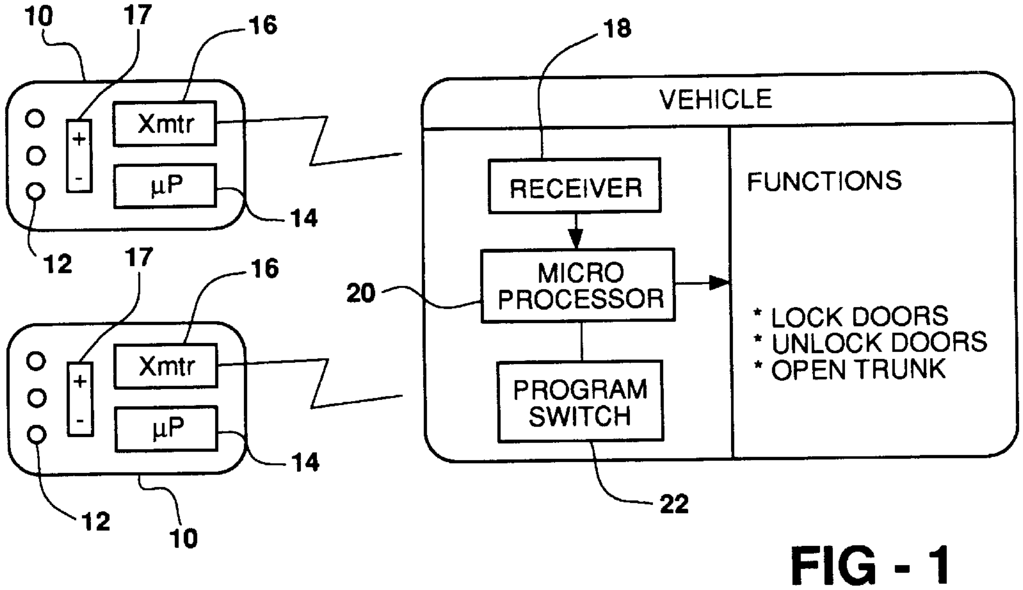
FIG - 1
( PRIOR ART )
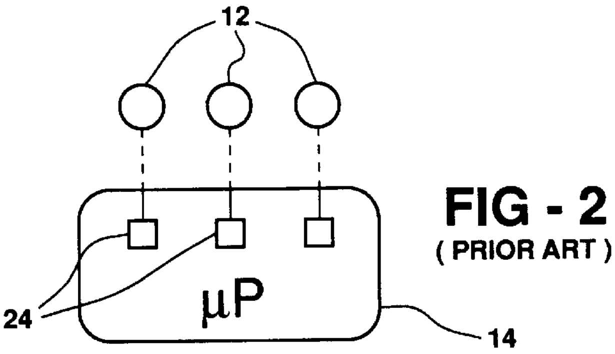
FIG - 2
( PRIOR ART )
| | | | | |
|---|---|---|---|---|
| PREAMBLE | TRANSMITTER ID | INITIAL SEED | CRYPTOGRAPHIC KEY | CRC |
FIG - 3
| | | | | | |
|---|---|---|---|---|---|
| PREAMBLE | FUNCTION CODE | TRANSMITTER ID | SEQUENCE NUMBER | AUTHENTICATOR | CRC |
FIG - 4

KEYLESS ENTRY SYSTEM WITH FAST PROGRAM MODE

FIELD OF THE INVENTION

This invention relates to a keyless entry system for a motor vehicle or other protected environment, and particularly to a programming method and apparatus to permit fast initial programming.

BACKGROUND OF THE INVENTION

Personal-size remote control transmitters are widely used to provide a convenient method of locking or unlocking vehicles, and/or to remotely arm or disarm vehicle theft deterrent systems. They are also used to control home/business security systems and garage door openers. If these transmissions can be spoofed or played back, then these systems can be controlled by unauthorized parties to gain unwanted access to the protected environment. Most, if not all, of these systems provide very little protection against spoofing and no protection at all against the playback of legitimate messages that have been recorded and/or modified. The term "spoofing" as used herein refers to the creation of a false message that is accepted by the system as a valid message.

Message authentication using cryptographic techniques is a good method for preventing spoofing and playback attacks. The U.S. Pat. No. 5,506,905 to Markowski et al entitled "AUTHENTICATION METHOD FOR KEYLESS ENTRY SYSTEM", which is incorporated herein by reference, is an example of an improved system of that type which produces very secure authenticated messages requiring a short transmission time to economize battery life in a personal transmitter. Such a keyless entry system for a motor vehicle, as shown in FIG. 1, includes a number of portable remote controls or fobs 10 small enough to carry in one's pocket or on a key chain. Each fob 10 has buttons 12 for manual selection of desired functions to be performed in the vehicle, a microprocessor 14 responsive to button actuation for formulating a command message, including an authenticator code and a function code identifying the desired function to be performed, and a radio transmitter 16 for transmitting the message. The fob 10 functions are supported by a miniature battery 17 which should have a life of several years. In the vehicle a receiver 18 receives the transmitted message, if the vehicle is within the transmitter range, and a microprocessor 20 acts upon data in the received message to determine whether the authenticator code is valid, and if so, to perform the desired function.

Each microprocessor 14 and 20 is programmed to execute a cryptographic algorithm which operates on certain stored and/or transmitted data, as well as on a selected function code to generate an authentication code which is different for every transmission, thus preventing successful replay of a previously transmitted message. The authentication code is sufficiently short to be transmitted economically but the generation procedure has a complexity that renders it impractical for an adversary to predict the next valid code based on knowledge of previously transmitted messages. The procedure for message validation is first to compare the transmitter ID with IDs stored in the receiver memory, and if an ID match is found, then for the algorithm in the microprocessor to operate on a combination of shared secret data and transmitted data to produce authentication codes, and to determine that the command is valid if the codes are the same.

Two mechanisms are jointly used to assure that the authentication code changes in an unpredictable manner.

First, the algorithm operates on a seed code which is changed according to a set of rules for each transmission. A sequence number is also incremented with each transmission and is included in the message so that the receiver algorithm will know how many seed code changes to execute in order to resynchronize with the transmitter since the receiver does not necessarily receive each transmission. Second, the authenticator code is generated as a function of the seed code and the cryptographic key as well as the desired function code. Since for each transmission the function code depends on which button the operator selects, another level of complexity is added to the authenticator code generation to confound attempts to determine a predictable progression of codes, all as described in the U.S. Pat. No. 5,506,905. As shown in FIG. 2, the actuation of any button 12 sends a signal to a respective hardware register 24 in the microprocessor 14 so that the microprocessor can determine which button or buttons are pressed. Pressing a certain sequence of buttons or a certain combination of buttons may be used for a special message whereas pressing a single button calls for a normal function such as door lock, unlock or trunk open.

In manufacture, the microprocessors of both the transmitter and the receiver are equipped with the same cryptographic engine to thereby calculate the same authenticator, given common input information. Each transmitter is permanently programmed with a cryptographic key, an initial seed, and an ID number. When a receiver is first matched with one or more transmitters, it must learn those three codes. This is accomplished by enabling the program switch 22 on the receiver and actuating the transmitter to send a program message containing these codes. The transmitter is typically actuated in this case by pressing two buttons simultaneously. The program message is shown in FIG. 3. It includes a preamble which indicates the start of a message, the transmitter ID, the initial seed, the cryptographic key and a CRC. The CRC (cyclic redundancy code) is calculated from all the other field data.

During use, a normal command is generated by pressing one transmitter button and a message is transmitted in the form shown in FIG. 4 including a preamble, a function code, the transmitter ID, a sequence number, an authenticator, and a CRC. If the transmitter normal message is sent a few times when the receiver is out of range, the receiver loses synchronization with the transmitter but can catch up by using the sequence number to resynchronize. If the receiver lags in sequence by a given amount such as 264 sequence numbers, it cannot automatically resynchronize. Then it is necessary to transmit a Resynch command which is like the normal command of FIG. 4 except that a randomly selected sequence number is used. When the Resynch command is given, the initial seed is used along with the new sequence number to determine the authenticator in both the transmitter and the receiver.

During manufacture of the system, the transmitters must be signed up to the receiver and then verified to ensure correct functioning of the system later when the system is attached to a vehicle. This has been accomplished by inserting the transmitters into a station where solenoids would manipulate the buttons in a particular way to induce a fast sign-up mode. This would send a program message after one second, but for only the first transmission of the program message. Thereafter the transmitter would require a 10 second delay for sending any subsequent messages. The longer delay is desirable to reduce the potential of inadvertently sending a program message once the transmitter was in the possession of the end user. The reduced time for initial sign up (along with the solenoid activity) is still too long for efficient manufacturing, and it is available only once. It is desirable to further reduce the sign up time and to increase its availability.

SUMMARY OF THE INVENTION

It is therefore an object of the invention to expedite the sign up procedures of matching a transmitter to a receiver of an authenticated message system.

The transmitter is programmed to immediately send a program command upon pressing a combination of buttons anytime within the first few transmitter actuations after the transmitter battery is installed. Then as determined by a counter, the fast mode terminates and a time delay is imposed, requiring the buttons to be held down for several seconds before sending any special commands, although normal commands do not experience any delay. The special commands include the program command and a Resynch command which is used to resynchronize the transmitter and receiver when the difference of sequence numbers is large. When the correct combination of buttons are held down, the Resynch command is issued first, after about 5 seconds, and then the program command is issued after 10 seconds.

BRIEF DESCRIPTION OF THE DRAWINGS

The above and other advantages of the invention will become more apparent from the following description taken in conjunction with the accompanying drawings wherein like references refer to like parts and wherein:

FIG. 1 is block diagram of a keyless entry system according to the prior art and which is modified to carry out the invention;

FIG. 2 is a schematic view of a portion of the transmitter of FIG. 1;

FIG. 3 is an illustration of message structure for programming according to the prior art;

FIG. 4 is an illustration of message structure for normal messages according to the prior art.

DESCRIPTION OF THE INVENTION

Figure 5:
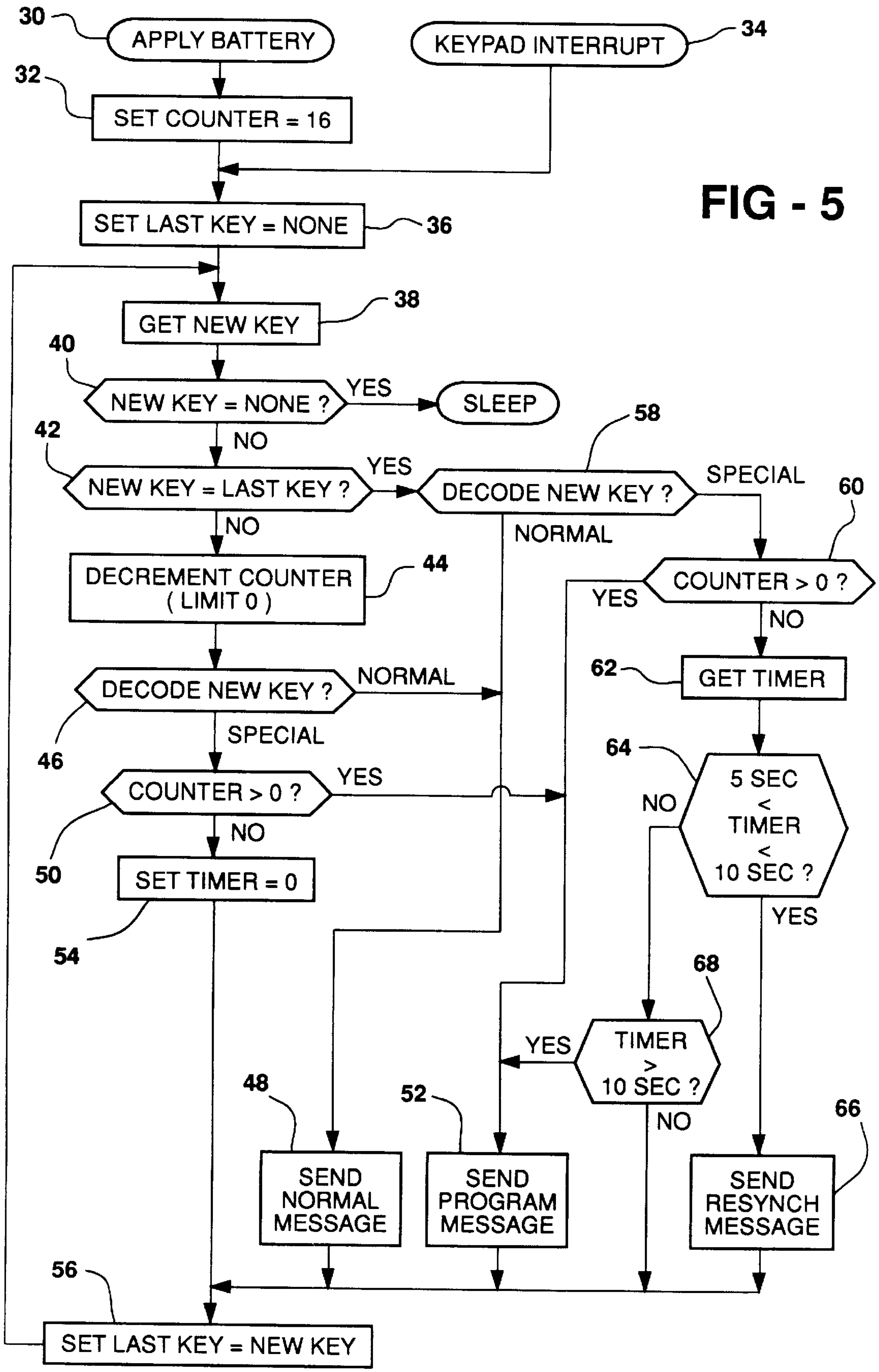
FIG. 5 is a flow chart illustrating an algorithm according to the invention for use in the transmitters of FIG. 1 to enhance sign up during manufacture.

To permit immediate transmission of a program message during factory setup, no time delay is imposed on the first several transmitter actuation after the transmitter battery is installed so that a normal message or a program message is sent immediately. After a limit is reached, normal messages are still sent without delay upon pressing a single button, but if a combination of buttons are actuated a Resynch message is sent after a first time delay and a program message is sent after an additional delay. This helps to prevent inadvertent Resynch and program messages. As described above, the Resynch message comprises the information shown in FIG. 4 and contains a randomly selected sequence number; the program message comprises the message shown in FIG. 3.

The flow chart of FIG. 5 represents an algorithm in the microprocessor 14 for controlling the timing of the messages. The functional description of each block in the chart is accompanied by a number in angle brackets <nn> which corresponds to the reference number of the block. When the transmitter battery 17 is installed <30> a counter is set to a chosen number such as 16 <32>. This will allow 16 messages of any type to be transmitted without delay upon actuation. When not actuated, the microprocessor remains in a sleep mode to conserve battery power. Actuating a button or combination of buttons on the keypad causes an interrupt to occur <34> as well as to enter a value into one or more registers as indicated in FIG. 4. The interrupt wakes the microprocessor. Then the Last Key is set to "none" <36> and the registers are polled to determine a New Key value <38>. If the New Key value is "none" the microprocessor returns to sleep mode <40> but if it has another value it is compared to Last Key <42>. If the keys are not the same, thereby indicating that a button has just been pressed, the counter is decrement <44>. The New Key value is decoded <46> and if one key is pressed a normal message is requested (lock door, unlock, open trunk) and the corresponding normal message is sent <48>. If a combination of buttons are pressed, say the lock and unlock button are actuated simultaneously, a special message is requested and if the counter content is greater than zero <50> a program message is sent <52>. If the counter has attained zero a free-running timer is set to zero <54>, Last Key is given the value of New Key <56> the algorithm control returns to block 38 to repeat the algorithm. Typically a 0.5 sec timer, not shown, is inserted after block 56 to limit the loop execution rate at two per second.

If in the subsequent loop New Key equals Last Key <42>, the key or combination is being held down. The New Key is decoded <58> and if the normal message is requested a normal message will be sent <48>. If a special message is requested and the counter is greater than zero <60> the program message will be sent <52>. If the counter content is not greater than zero <60>the timer value is obtained <62>. If the timer value is greater than 5 sec and less than 10 sec <64>, a Resynch message is sent <66>. If the timer value is greater than 10 sec <68> the program message is sent <52> but if it fails the test of both blocks 64 and 68 no message is sent.

It will be noted that to satisfy the time conditions of blocks 64 and 68, the buttons must be held down until the desired message is sent. Holding the buttons for a longer time will effect repeated message transmission. It is desirable to limit the number of repeat messages.

It will thus be seen that the invention provides the ability to trigger a program message without delay during factory sign-up or when programming a receiver in service to recognize a new transmitter and even allows more than one such fast sign-up. After the several initial transmissions have occurred, the programming function is still available with a 10 second delay and a Resynch function will occur with a 5 second delay.

The embodiments of the invention in which an exclusive property or privilege is claimed are defined as follows:

1. In a keyless entry system including a receiver and a transmitter, the transmitter having a battery, and being operative in response to user actuation to formulate and transmit (a) normal messages to activate a function and (b) program messages to provide transmitter ID information to the receiver, the improvement wherein:

the transmitter operates in a first mode for a limited number of user actuations after installation of said battery, and in a second mode after the limited number of user actuations, the transmitter being operative in said first mode to transmit both normal and program messages without delay upon user actuation, and in the second mode to delay transmitting program messages a predetermined time after user actuation.

2. The improvement of claim 1 wherein the transmitter includes:

a counter for counting the number of user actuations following battery installation; and means for switching from said first mode to said second mode when a predetermined count is attained by said counter.

3. The improvement of claim 1 wherein the transmitter and receiver normally operate in synchronism but are subject to loss of synchronism under certain conditions and wherein the transmitter times each actuation during the second mode of operation, and transmits a Resynch message when the time of such actuation exceeds a reference time.

4. The improvement of claim 1 wherein the transmitter and receiver normally operate in synchronism but are subject to loss of synchronism under certain conditions and wherein the transmitter is effective during the second mode of operation to transmit a Resynch message at a time after actuation that is longer time than said predetermined time.

5. In a keyless entry system having a transmitter and a receiver for performing any of several functions in a protected environment wherein the transmitter transmits normal messages and special messages for identifying the transmitter upon transmitter actuation, a method of transmitting special messages to the receiver comprising the steps of:

actuating the transmitter;

setting a counter to a prescribed value;

stepping the count in the counter for each actuation;

when the count is within a given range of the prescribed value and the transmitter is actuated to transmit a special message, immediately transmitting the program message; and when the count exceeds the given range and the transmitter is actuated to transmit a special message transmitting the special message after a time delay.

6. The method as defined in claim 5 wherein:

the step of transmitting the special message after a time delay is conditioned on maintaining transmitter actuation throughout the delay time.

7. The method as defined in claim 5 wherein the transmitter and receiver normally operate in synchronism but are subject to loss of synchronism under certain conditions and wherein:

when the count exceeds the given range and the transmitter is actuated to transmit a special message, transmitting a Resynch message after a first period.

8. The method as defined in claim 5 wherein the transmitter and receiver normally operate in synchronism but are subject to loss of synchronism under certain conditions and wherein:

when the count exceeds the given range and the transmitter is actuated to transmit a special message, transmitting a Resynch message after a first period and transmitting a program message after a second period which is greater than the first period, whereby the Resynch message is sent prior to the program message.

9. The method as defined in claim 8 wherein the transmitter has a plurality of buttons each for a respective normal message and wherein:

actuating the transmitter comprises pressing one button for a normal message and pressing a combination of buttons for a special message; and when the count exceeds the given range actuating the transmitter comprises holding down the combination of buttons until the respective messages are sent.

10. The method as defined in claim 5 wherein the transmitter has a plurality of buttons each for a respective normal message and wherein:

actuating the transmitter comprises pressing one button for a normal message and pressing a combination of buttons for a special message.

* * * * *